Feb. 1, 1966 V. C. ROSS ETAL 3,232,650
KNOB SECUREMENT AND METHOD
Filed March 7, 1962
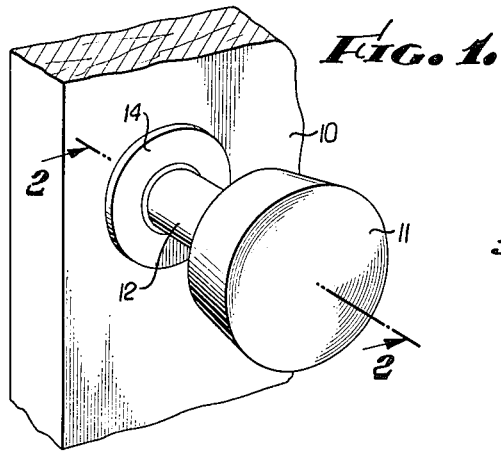
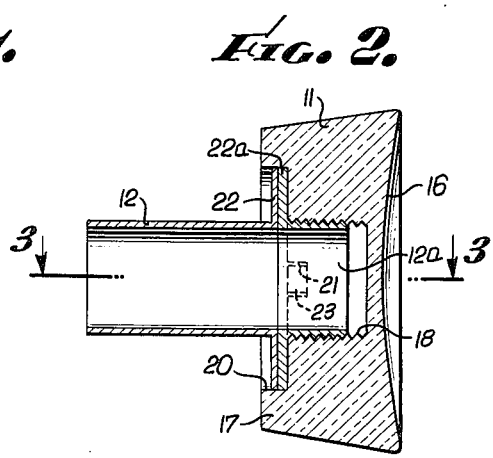
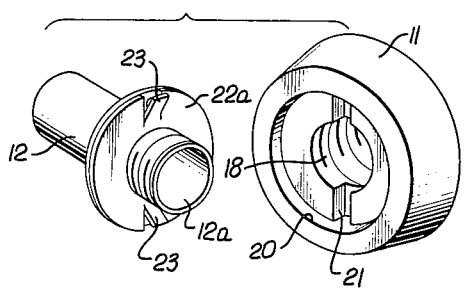
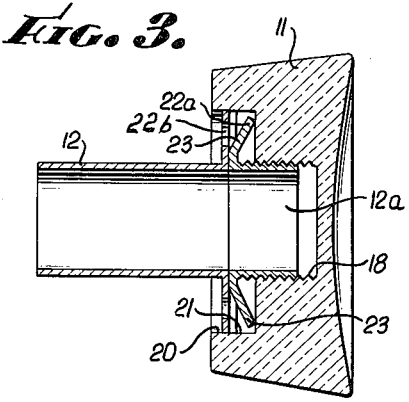
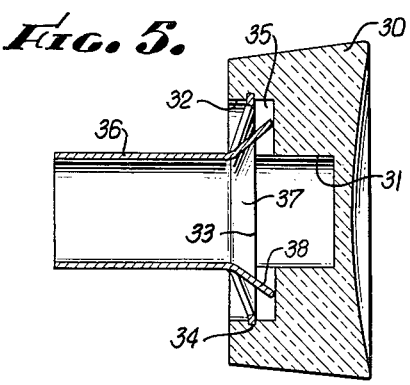
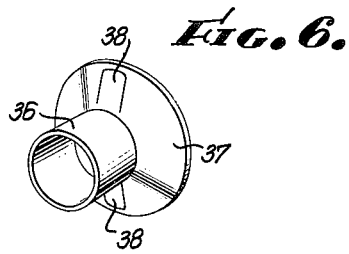
VIOLET C. ROSS
JAMES E. ROSS
INVENTORS.
BY *Albert Hay*
ATTORNEY.

United States Patent Office 3,232,650
Patented Feb. 1, 1966

3,232,650
KNOB SECUREMENT AND METHOD
Violet C. Ross, 3642 W. 139th St., and James E. Ross, 14011 Kornblum Ave., both of Hawthorne, Calif.
Filed Mar. 7, 1962, Ser. No. 178,066
1 Claim. (Cl. 287—53)

This invention relates to the securement of knobs or comparable members to a shank or spindle and more particularly to methods and/or techniques for making such securements.

The invention is particularly adaptable to the securement of knobs, such as door knobs to a shank or spindle, but it may also find application in the securement of other members to a shank, spindle or other part.

The invention has particular application in the securement of ceramic or tile knobs to a shank but it is adaptable as well in the securement of knobs or the like which may be made of other materials, such as bronze, brass, steel, stainless steel, clay, porcelain, hardware, plastics, stone and the like.

The securement of knobs and the like to a shank has presented a problem in the prior art. It has been difficult to achieve a positive and firm securement in a simple and effective way.

The general object of this invention is to provide an extremely simple but positive securement of a knob to a shank or the like.

A further object is to achieve and realize the result as stated in the previous object without the use of additional parts or hardware other than the knob and the shank itself.

A further object is to provide a knob securement wherein an opening is provided in the knob having an undercut groove, the shank having a flange part which is forced and deformed so that its edge portions are received in the undercut groove with a force fit so that the parts are permanently secured together.

An additional object of the invention is to provide a knob securement to a shank having novel means for prevention of rotation of the knob with respect to the shank.

Further and more detailed objects and advantages of the invention will become apparent from the following description and the annexed drawing wherein:

FIGURE 1 is a perspective view of a knob embodying one form of securement of this invention.

FIGURE 2 is a sectional view taken on line 2—2 of FIGURE 1.

FIGURE 3 is a sectional view taken on line 3—3 of FIGURE 2.

FIGURE 4 is an exploded perspective view of the knob and securement shown in FIGURES 1 to 3.

FIGURE 5 is a view similar to FIGURE 3 showing a modified form of knob securement.

FIGURE 6 is a perspective view of the shank element shown in FIGURE 5 prior to its securement to the knob.

Referring now more particularly to the various figures of the drawing, numeral 10 designates a part of a door or panel having an operating knob 11. The knob has a cylindrical shank or spindle 12 extending through the circular escutcheon plate 14 on the door or panel.

It is to be understood that the knob 11 is representative of any knob which may operate any type of mechanism such as a latch or bolt through a shank, shaft or spindle.

The knob 11 may be made of any material which such knobs may ordinarily be made of, and is referred to in more detail in the foregoing FIGURES 1 to 4. The particular knob shown in the figures by way of example is circular and has a slight taper as shown. The outer face is dished so as to be concave as shown at 16. The inner face 17 of the knob is flat, and in it there is formed a threaded bore 18 and a counter-bore 20. The bottom of counter-bore 20 has a radially opposite pair of recesses or grooves 21 which are formed in threaded bore 18.

Shank 12 has a flange 22 of a size to be received in counter-bore 20. An externally threaded shank extension 12a has a flange 22a in counter-bore 20 in abutting relation to flange 22 to which it is or may be integrally secured, as by welding, brazing or the like, or flange 22a may be formed as a continuous part of flange 22 and shank 12. Flange 22a is formed with a radially oppositely disposed pair of tongues 23 which are deformed outwardly into recesses 21 in the final assembly of the knob securement.

In the assembly of the securement the shank extension 12a is screwed into the threaded bore 18 of knob 11, it being understood that tongues 23 will initially be disposed radially against the flange 22 of shank 12. The shank extension will be run into the bore 18 until the flange 22a is essentially adjacent the inner flat face of counter-bore 20. Thereupon tongues 23 will be deformed or pressed inwardly into recesses 21. It will be understood that the phasing of the threads of the shank extension 12a and those of the bore 18 will be such that when the extension 12a is run into the full limit that tongues 23 will lie opposite recesses 21 to permit them to be deformed inwardly therein. It will also be understood that if the flange 22a is separate from flange 22 that apertures 22b will need to be made in flange 22 to permit a tool to be inserted therethrough to deflect or to deform the tongues 23 in the manner indicated. As an alternative arrangement, the tongue formations 23 may be made to include adjacent portions of flange 22. With the securement completed as shown in FIGURE 3, the parts are positively secured together and cannot be pulled apart. The fit is made tight and snug so that the knob 11 itself cannot rotate relatively to the shank 12, but rather the two parts rotate together. If desired, a cement may be used on the inner surfaces of the flange 22a so that it becomes cemented to the flat bottom surface of the recess, however such cementing attachment is not ordinarily necessary.

FIGURES 5 and 6 show a modified form of the invention wherein a knob 30 is generally similar to knob 11 and is formed with a bore 31 and a counter-bore 32, the inner end of which has an annular face 33. Counter-bore 32 is formed with an undercut annular recess 34 and a pair of diametrically opposite recesses 35 are formed interiorly of face 33.

A shank 36, FIGURE 6, has an annular flange 37 which is initially formed with a slight flair and of a size to be received in counter-bore 32. Flange 37 is formed with a pair of radially opposite tongues 38 which are deformed outwardly as shown in FIGURE 5.

In assembling the securement of FIGURES 5 and 6 the shank 36 and the flange 37 are inserted into counter-bore 32 and so positioned that tongues 38 will extend into recesses 35. Axial force is then applied to the shank 36 in any convenient manner, as by means of an anvil or a press member, and this force will move the periphery of flange 37 into annular under-cut recess 34 and thereby deform the flange with a permanent set. The knob and shank are thereby positively secured together and cannot be pulled apart. Furthermore the tongue and recess engagement 35–38 will provide a positive turning action of the shank by the knob 30.

From the foregoing description those skilled in the art will observe that the invention provides an improved knob securement which is not only effective but extremely simple in that no additional parts or hardware other than the knob and shank themselves are required. While the invention is exemplified herein in a circular knob and shank combination, the invention may find application in knobs and shanks of other shapes and configurations as well as in securement of parts other than knobs. The invention has particular application with respect to knobs made of material, such as certain compositions which are not adaptable to the use of additional parts or hardware for making the securement.

The foregoing disclosure is representative of preferred forms of the invention and is to be interpreted in an illustrative rather than limiting sense, the invention to be accorded the full scope of the claim appended hereto.

What is claimed is:

A knob securement comprising, in combination, a knob, said knob having a circular bore and a circular counterbore, a tubular shank extending into and fitting said counterbore, said shank having a first flange and a second flange juxtaposed adjacent said first flange and extending into and fitting in said counterbore, means providing a recess in the bottom of the counterbore, said second flange having a tongue formed from the material thereof and bent to extend inwardly into said recess to prevent relative rotation between the knob and shank, the second flange being flush against the bottom of the counterbore, said flanges being of the same diameter, said first flange having an opening adjacent said tongue to allow a tool to be inserted therethrough for bending said tongue into said recess and said knob and shank having mutual configurations securing them together independently of any other parts.

References Cited by the Examiner
UNITED STATES PATENTS

| | | | |
|---|---|---|---|
| 173,126 | 2/1876 | Little | 287—53 X |
| 941,906 | 11/1909 | Beardsley. | |
| 1,166,345 | 12/1915 | Gates | 287—53 X |
| 1,575,410 | 3/1926 | Bradley. | |
| 1,896,388 | 2/1933 | Zeidler | 151—42 |
| 2,940,781 | 6/1960 | Erikson. | |

FOREIGN PATENTS 1,278,063 10/1961 France.

CARL W. TOMLIN, *Primary Examiner.*

WALTER A. SCHEEL, WILLIAM FELDMAN,
*Examiners.*